United States Patent
Yanagi et al.

(10) Patent No.: US 8,109,623 B2
(45) Date of Patent: Feb. 7, 2012

(54) INK-JET RECORDING METHOD AND RECORDED MATTER

(75) Inventors: Terukazu Yanagi, Ashigarakami-gun (JP); Akio Tamura, Ashigarakami-gun (JP); Takahiro Ishizuka, Ashigarakami-gun (JP); Takahiro Kato, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 309 days.

(21) Appl. No.: 12/406,752

(22) Filed: Mar. 18, 2009

(65) Prior Publication Data

US 2009/0246488 A1  Oct. 1, 2009

(30) Foreign Application Priority Data

Mar. 25, 2008 (JP) ................. 2008-079168

(51) Int. Cl.
*G01D 11/00* (2006.01)
(52) U.S. Cl. ............... 347/100; 347/101; 347/102
(58) Field of Classification Search ........... 347/95, 347/96, 101, 102, 100, 105; 106/31.6, 31.13, 106/31.27; 523/160, 161
See application file for complete search history.

(56) References Cited

U.S. PATENT DOCUMENTS

| | | | | |
|---|---|---|---|---|
| 6,746,115 | B2 * | 6/2004 | Tomotake et al. | 347/100 |
| 6,926,399 | B2 * | 8/2005 | Yoshizawa et al. | 347/102 |
| 2003/0189626 | A1 | 10/2003 | Kataoka et al. | |
| 2006/0221166 | A1 * | 10/2006 | Inoue | 347/104 |
| 2006/0270756 | A1 * | 11/2006 | Hanmura et al. | 523/160 |
| 2007/0015849 | A1 * | 1/2007 | Aoyama | 523/160 |

FOREIGN PATENT DOCUMENTS

JP  2000-351931 A  12/2000

OTHER PUBLICATIONS

EP Communication, dated Jul. 30, 2009, issued in corresponding EP Application No. 09003890.2, 6 pages.

* cited by examiner

*Primary Examiner* — Manish S Shah
(74) *Attorney, Agent, or Firm* — Sughrue Mion, PLLC

(57) ABSTRACT

An ink-jet recording method is provided. The ink-jet method includes recording an images by ejecting, onto a recording medium by an-inkjet method, a liquid composition containing polymer particles having a glass transition temperature (Tg) higher than the minimum film forming temperature (MFT) at least by 5° C., a hydrophilic organic solvent, a surfactant, and water under ejection conditions satisfying all of the following (1) to (3): (1) Tg>the temperature of the liquid composition at the time of ejection>MFT, (2) MFT>20° C., and (3) the temperature of the liquid composition at the time of ejection is 30° C. or higher.

12 Claims, 1 Drawing Sheet

INK-JET RECORDING METHOD AND RECORDED MATTER

CROSS-REFERENCE TO RELATED APPLICATIONS

This Application claims priority under 35 USC 119 from Japanese Patent Application No. 2008-079168, the disclosure of which is incorporated by reference herein.

BACKGROUND OF THE INVENTION

1. Field of the Invention

The present invention relates to an ink-jet recording method and a recorded matter recorded by the method.

2. Description of the Related Art

As recording media for ink-jet recording, various recording media have been studied and techniques capable of forming high quality images are in demand. Further, for inks, various kinds of ink materials have been investigated from the viewpoint of water proofness and light fastness, etc.

For example, for a colorant, which is one ingredient contained in ink materials, pigments have generally been used and the pigments are used as dispersed in a dispersion medium such as water. When using a pigment in a dispersion form, the diameter of particles when they are dispersed, stability after dispersion, particle size uniformity, and ejection properties from an ejection head and the like are important considerations, and various studies have been conducted regarding techniques for improving these aspects.

On the other hand, when recording is performed on plain paper or the like, sufficient performance sometimes cannot be obtained with respect to, for example, fixing property (for example, scratch resistance) or resolution, in addition to color forming density. In particular, this is the case when increasing the speed of ink-jet recording, and a recording method more suitable for high speed recording using a single pass system capable of recording by one operation of a head, as opposed to a shuttle scanning system, is in demand.

In connection with the situation described above, an ink composition containing colorant particles having a charge and a resin emulsion having a charge of a polarity identical to the charge of the colorant particle, in which the glass transition temperature (Tg) of the resin emulsion is 35° C. or higher and the minimum film-forming temperature (MFT) is 20° C., has been disclosed (refer, for example, to Japanese Patent Application Laid-Open (JP-A) No. 2000-351931). It is described that the ink composition can provide a clear image while suppressing image bleeding and is excellent in water proofness, weather proofness, and ejection stability and ejection responsive property in high frequency driving.

SUMMARY OF THE INVENTION

However, in the ink composition described above, it is difficult in practice to maintain ejection stability since the composition contains a resin emulsion having a low MFT. That is, in a case where, after image recording, ink ejection is suspended and the head is left for a certain time, subsequent ejection accuracy is remarkably reduced and this results in problems such as failure in ejection directionality, thereby causing offset of ink droplet deposition positions on a recording medium.

This causes problems, in particular, when employing a recording method by a single pass method involving little or no dummy jet ejection and this problem is particularly pronounced in the case of high speed recording.

The present invention has been made in view of the above circumstances and provides an ink-jet recording method and a recorded matter.

The present inventor has found that the relationship between the physical properties of polymer particles contained in a liquid composition that forms an image and the liquid temperature of the liquid composition during recording is connected to ejection stability and to image strength after recording, and the invention has been achieved based on this finding.

According to a first aspect of the invention, an ink-jet recording method is provided. The ink-jet recording method includes recording an image by ejecting, onto a recording medium by an ink-jet method, a liquid composition containing polymer particles having a glass transition temperature (Tg) higher than the minimum film-forming temperature (MFT), a hydrophilic organic solvent, a surfactant, and water under ejection conditions satisfying all of the following (1) to (3):

(1) Tg>the temperature of the liquid composition at the time of ejection>MFT, (2) MFT>20° C., (3) the temperature of the liquid composition at the time of ejection is 30° C. or higher.

According to a second aspect of the invention, a recorded matter recorded by the ink-jet recording method according to the first aspect of the invention is provided.

DETAILED DESCRIPTION OF THE INVENTION

Figure 1:
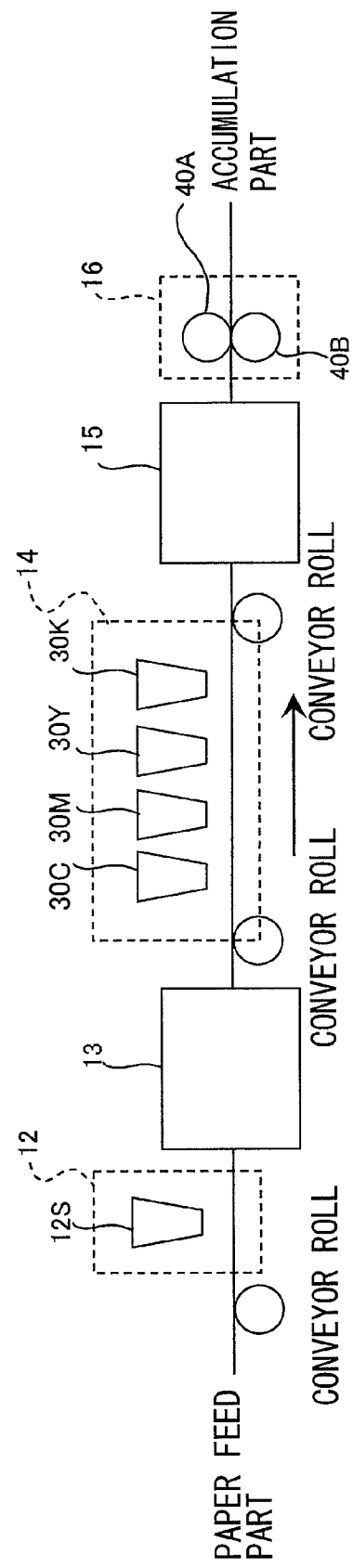
FIG. 1 is a schematic constitutional view showing an example of the structure of an ink-jet recording apparatus used for performing an image recording method according to the present invention.

An ink-jet recording method of the present invention will be described in detail.

The ink-jet recording method of the invention includes recording an image by ejecting, onto a recording medium, a liquid composition containing polymer particles having a glass transition temperature (Tg: hereinafter sometimes simply referred to as: "Tg") higher than the minimum film-forming temperature (MFT; hereinafter sometimes referred to simply as "MFT"), a hydrophilic organic solvent, a surfactant, and water, by an ink-jet method under ejection conditions satisfying all of the following (1) to (3) (hereinafter sometimes referred to as "ejection step").

(1) Tg [° C.]>the temperature of the liquid composition at the time of ejection [° C.]>MFT [° C.], (2) MFT [° C.]>20° C., and (3) the temperature of the liquid composition at the time of ejection is 30° C. or higher.

The minimum film-forming temperature (MFT) is a boundary temperature [° C.] between a temperature range in which white powdery precipitates are formed and a temperature range in which a transparent film is formed, when coating an aqueous dispersion of polymer particles of a solid concentration of 25% and subsequently drying the film while heating so as to provide a temperature gradient to the film. The MFT is determined by coating a liquid composition at 30° C. or higher and then measuring the film surface temperature when drying.

Further, the glass transition temperature (Tg) is a value obtained as follows. The aqueous dispersion of polymer particles is heated and dried to solidness, which is then subjected to a measurement by a differential scanning calorimetry (DSC), thereby measuring the glass transition temperature (Tg).

According to the invention, when recording an image by an ink-jet method, polymer particles that satisfy the relationship of Tg>MFT are used and ejection conditions that satisfy all of (1) to (3) described above with respect to the relationships between the polymer particles and the temperature conditions at the time of ejection are employed. As a result, favorable ejection accuracy of re-started ejection subsequent to temporary suspension of ejection (for example, temporary suspension after a period of continuous ejection) may be obtained. Further, a film may be formed in a short period after deposition of ejected ink droplets to the recording medium, which may result in improvement of the friction resistance of an image. Further, by controlling the temperature of the liquid composition at the time of ejection to 30° C. or higher, sensitivity to ambient conditions may be reduced, and effects of improving the ejection accuracy and the friction resistance may be stabilized. In addition, blocking due to sticking or the like may be suppressed.

—Ejection Step—

In the ejection step, the liquid composition is ejected to a recording medium by an ink-jet method under the ejection conditions satisfying all of (1) to (3) described above. The liquid composition can be applied selectively to desired regions on the recording medium by an ink-jet method and a colored image can be recorded in a case where the liquid composition contains a coloring material.

In the ejection step according to the invention, the liquid temperature at the time of ejection of the liquid composition used for ejection is controlled such that, in a relationship with the physical property of polymer particles in the liquid composition, the relationship of Tg>temperature of the liquid composition at the time of ejection>MFT. Generally, the relationship between Tg and MFT is Tg<MFT. According to the invention, however, the relationship between Tg and MFT is Tg>MFT, and further, the temperature of the liquid composition at the time of ejection is controlled to a temperature between Tg and MFT. This can provide an effect of improving the ejection property of the liquid composition, and enabling film formation just after droplet deposition on a recording medium and enhancing the scratch resistance of a recorded image after ejection.

"The temperature of the liquid composition at the time of ejection" is obtained by measuring the temperature of an ink (liquid composition) supplied to an ink head. Further, the temperature of the liquid composition at the time of ejection can be controlled by heating or cooling an ejection head or a communication pipeline for connecting the ejection head and a storage tank for storing the liquid composition, or heating or cooling the liquid composition in the storage tank. Heating or cooling can be performed, for example, by using a heating device such as a heater or a cooling mechanism such as a refrigerant circulation system, or by the combination of them.

The MFT for the polymer particles is a temperature region higher than 20° C. In a case where the MFT is 20° C. or lower, the ejection accuracy of the re-started ejection subsequent to a temporary suspension after ejection (in particular, temporary suspension after a period of continuous ejection) may be degraded, for example, due to failure in the ejection directionality, which may cause offset in the ink droplet deposition position on the recording medium.

Further, the temperature of the liquid composition is controlled such that the temperature at the time of ejection is maintained at 30° C. or higher. In a case where the temperature at the time of ejection is not maintained to 30° C. or higher, it tends to undergo the effects of external circumstances and consequently, it may be difficult to maintain a relationship between the polymer particles and the ejection temperature in the ejection step as: the temperature of liquid composition at the time of ejection>MFT>20° C.

In the ejection step, the MFT of the polymer particle is preferably 20° C. or higher and, more preferably, 30° C. or higher in a view of the ejection accuracy. While the upper limit for MFT is not particularly limited as long as the MFT does not exceed the temperature of the liquid composition at the time of ejection. The upper limit of MFT is preferably 60° C.

Further, while the temperature of the liquid composition at the time of ejection may be any temperature in a range of lower than the Tg and higher than the MFT in accordance with the kind of the polymer particles, it is preferably in a range of 30° C. or higher and 75° C. or lower and, more preferably, in a range of 40° C. or higher and 70° C. or lower, from a view point of suppressing the effect of the external circumstances with less energy.

The difference between Tg and MFT described above is, preferably, 5° C. or more and, more preferably, 10° C. or more from a view point of compatibility between the fixing property and the ejection stability.

Image recording by utilizing the ink-jet method can be performed, specifically, by supplying energy thereby ejecting a liquid composition to a desired recording medium, that is, plain paper, resin-coated paper, paper used exclusively for ink-jet recording described, for example, in JP-A Nos. 8-169172, 8-27693, 2-276670, 7-276789, 9-323475, 62-238783, 10-153989, 10-217473, 10-235995, 10-337947, 10-217597, and 10-337947, films, common use paper for electrophotography, clothes, glass, metals, ceramics, etc. As the ink-jet recording method suitable to the invention, a method described in JP-A No. 2003-306623, in columns (0093) to (0105) may be applicable.

The ink-jet method is not particularly limited and may be of any known system, for example, a charge control system of ejecting an ink by utilizing an electrostatic attraction force, a drop on demand system of utilizing a vibration pressure of a piezo element (pressure pulse system), an acoustic ink-jet system of converting electric signals into acoustic beams, irradiating them to an ink, and ejecting the ink by utilizing a radiation pressure, and a thermal ink-jet system of heating an ink to form bubbles and utilizing the resultant pressure (BUBBLEJET (registered trade mark)). As the ink-jet method, an ink-jet method described in JP-A No. 54-59936 of causing abrupt volume change to an ink that undergoes the effect of thermal energy, and ejecting the ink from a nozzle by an operation force due to the change of state can be utilized effectively.

Examples of the ink-jet method include a system of injecting a number of ink droplets of low concentration, a so-called "photo-ink" each in a small volume, a system of improving an image quality by using plural kinds of inks of a substantially identical hue and of different densities, and a system of using a colorless transparent ink.

The ink-jet head used in the ink-jet method may be either an on-demand system or a continuous system. The ejection system includes, specifically, for example, an electric-mechanical conversion system (for example, single cavity type, double cavity type, bender type, piston type, share mode type, and shared wall type, etc.), an electric-thermal conversion system (for example, thermal ink-jet type, BUBBLEJET (registered trade mark) type, etc.), an electrostatic attraction system (for example, electric field control type, and slit jet type, etc.), and an electric discharge system (for example, spark jet type, etc.) and any of the ejection systems may be used.

Ink nozzle, etc. used for recording by the ink-jet method are not particularly limited but can be selected properly depending on the purpose.

Examples of the ink-jet head include an ink-jet head of a shuttle system in which a short serial head is used and recording is performed while allowing the head to scan in the lateral direction of a recording medium, and an ink jet head of a line system in which a line head in which recording elements are arranged corresponding to the entire region for one side of a recording medium is used. In the line system, an image can be recorded over the entire surface of the recording medium by allowing the recording medium to be scanned in the direction crossing to the direction of arranging the recording elements, in which a transportation system such as a carriage by which the short head moves for scanning is not necessary. Further, since complicate scanning control for the movement of the carriage and the recording medium is not necessary and only the recording medium is moved, higher recording speed can be attained compared with the shuttle system. While the ink-jet recording method of the invention is applicable to any one of them, the effect of improving the ejection accuracy and the scratch resistance of the image is generally remarkable when the ink-jet recording method is applied to the line system without performing dummy jetting.

The liquid composition used in the ejection step will be described in detail.

The liquid composition in the invention contains polymer particles having a glass transition temperature (Tg) higher than the minimum film-forming temperature (MFT), a hydrophilic organic solvent, a surfactant, and water and, preferably, contains a coloring material as a material for coloring. The liquid composition may further include other ingredient(s) if necessary.

(Polymer Particle)

The liquid composition in the invention contains at least one kind of polymer particles having a glass transition temperature (Tg) higher than the minimum film-forming temperature (MFT). Since the polymer particle satisfies the relationship of Tg>MFT, stable ejection property can be obtained and, further, blocking (sticking, etc.) of the image after recording can be suppressed.

Examples of the polymer particle in the invention include particles of a resin having an anionic group. Examples of the resin having an anionic group include thermosetting, or modified acrylic, epoxy, polyurethane, polyether, polyamide, unsaturated polyester, phenolic, silicone, and fluoro resins, polyvinyl type resins such as vinyl chloride, vinyl acetate, polyvinyl alcohol, and polyvinyl butyral resins, polyester resins such as alkyd resins and phthalic acid resins, amino type materials such as melamine resins, melamine formaldehyde resins, amino alkyd condensate resins, urea resin, and copolymers or mixtures thereof.

Among them, the anionic acrylic resin is obtained, for example, by polymerizing an acrylic monomer having an anionic group (anionic group-containing acrylic monomer) and, optionally, a monomer(s) copolymerizable with the anionic group-containing acrylic monomer in a solvent. Examples of the anionic group-containing acrylic monomer include acrylic monomers having at least one selected from the group consisting of a carboxyl group, a sulfonic acid group, and a phosphonic group. Among them, acrylic monomers having a carboxyl group (for example, acrylic acid, methacrylic acid, crotonic acid, ethacrylic acid, propyl acrylic acid, isopropyl acrylic acid, itaconic acid, and fluoric acid, etc.) are preferred, and acrylic acid or methacrylic acid are particularly preferred.

As the polymer particles in the invention, self-dispersing polymer particles are preferred and self-dispersing polymer particles having a carboxyl group is more preferred, from a view point of the ejection stability and the liquid stability (particularly, dispersion stability) in a case of using a coloring material (particularly, pigment), which will be described later. The self-dispersing polymer particles mean particles of a water-insoluble polymer which can form a dispersion state in an aqueous medium by means of a functional group (particularly, an acidic group or a salt thereof) of the polymer per se in the absence of other surfactant, and are water-insoluble polymer particles not containing an additional emulsifier.

The dispersion state may be an emulsified state where the water-insoluble polymer is dispersed in a liquid state in an aqueous medium (emulsion) or a state where the water-insoluble polymer is dispersed in a solid state in the aqueous medium (suspension).

The water-insoluble polymer in the invention is preferably such a water-insoluble polymer that can form a dispersion state where the water-insoluble polymer is dispersed in a solid state, from a view point of the aggregation rate and the fixing property when it is formulated as a liquid composition.

The dispersion state of the self-dispersing polymer particles in the invention means such a state where stable presence of a dispersion state can be confirmed visually at 25° C. for at least one week after mixing and stirring a solution in which 30 g of a water-insoluble polymer is dissolved into 70 g of an organic solvent (for example, methyl ethyl ketone), a neutralizing agent capable of neutralizing a salt-forming group of the water-insoluble polymer to 100% (sodium hydroxide when the salt forming group is anionic or acetic acid when the group is cationic), and 200 g of water (apparatus: a stirrer equipped with a stirring blade, number of rotation: 200 rpm, 30 min, 25° C.), and then removing the organic solvent from the liquid mixture.

Further, the water-insoluble polymer means such a polymer showing an amount of dissolution of 10 g or less when the polymer is dried at 105° C. for 2 hr and then dissolved in 100 g of water at 25° C. The amount of dissolution is, preferably, 5 g or less and, more preferably, 1 g or less. The amount of dissolution is the amount of dissolution when the polymer is neutralized with sodium hydroxide or acetic acid to 100% in accordance with the kind of the salt-forming group of the water-insoluble polymer.

The aqueous medium contains water and may optionally contain a hydrophilic organic solvent. In the invention, the aqueous medium preferably includes water and the hydrophilic organic solvent in an amount of 0.2 mass % or less relative to water and, more preferably, the aqueous medium consists of water.

The main chain skeleton of the water-insoluble polymer is not particularly limited and, for example, vinyl polymer or condensated type polymer (epoxy resin, polyester, polyurethane, polyamide, cellulose, polyether, polyurea, polyimide, polycarbonate, etc.) can be used. Among them, the vinyl polymer is particularly preferred.

Preferred examples of the vinyl polymer and the monomer used for the vinyl polymer include those described in JP-A Nos. 2001-181549 and 2002-88294. Further, vinyl polymers introduced with a dissociative group to a terminal end of a polymer chain by radical polymerization of a vinyl monomer using a chain transfer agent, a polymerization initiator, or an iniferter having a dissociative group (or substituent that can be induced to the dissociative group) or by ionic polymerization using a compound having a dissociative group (or substituent that can be induced to the dissociative group) to an initiator or a terminator can also be used.

Preferred examples of condensated type polymers and monomers used for the condensated type polymers include those described in JP-A No. 2001-247787.

The self-dispersing polymer particles in the invention preferably contain a water-insoluble polymer containing a hydrophilic constituent unit and a constituent unit derived from an aromatic group-containing monomer from a viewpoint of the self-dispersibility.

The hydrophilic constituent unit is not particularly limited so long as it is derived from a hydrophilic group-containing monomer and it may be either a unit derived from one kind of hydrophilic group-containing monomer or a unit derived from two or more kinds of hydrophilic group-containing monomers. The hydrophilic group is not particularly limited and it may be either a dissociative group or a nonionic hydrophilic group.

In the invention, the hydrophilic group is preferably a dissociative group from a view point of promoting the self-dispersibility and a view point of stability of the formed emulsified or dispersed state and, more preferably, an anionic dissociative group. Examples of the dissociative group include a carboxylic group, a phosphoric acid group, and a sulfonic acid group and, among them, the carboxylic group is preferred from a viewpoint of the fixing property when used the ink composition.

The hydrophilic group-containing monomer in the invention is preferably a dissociative group-containing monomer and, preferably, a dissociative group-containing monomer having a dissociative group and an ethylenically unsaturated bond from a viewpoint of the self-dispersibility and the aggregation property.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methyl succinic acid, etc. Specific examples of the unsaturated sulfonic acid monomer include styrene sulfonic acid, 2-acrylamide-2-methylpropane sulfonic acid, 3-sulfopropyl(meth)acrylate, and bis(3-sulfopropyl)-itaconic acid ester. Specific examples of the unsaturated phosphoric acid monomer includes, specifically, vinyl phosphonic acid, vinyl phosphate, bis(methacryloyloxyethyl) phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, the unsaturated carboxylic acid monomer is preferred and, acrylic acid and methacrylic acid are more preferred from a viewpoint of the dispersion stability and the ejection stability.

The self-dispersibility polymer particles in the invention preferably contain a polymer having a carboxyl group and contains, more preferably, a polymer having a carboxylic group and an acid value (mgKOH/g) of from 25 to 100, from a viewpoint of the self-dispersibility and the aggregation rate when the liquid composition containing the polymer particles is in contact with a treating liquid. The acid value is, more preferably, from 25 to 80 and, particularly preferably, from 30 to 65, from a viewpoint of the self-dispersibility and the aggregation rate when the liquid composition containing the polymer particles is in contact with the treating liquid.

Particularly, when the acid value is 25 or more, the stability of the self-dispersibility may be more favorable, and when the acid value is 100 or less, the aggregation property may be improved.

The aromatic group-containing monomer is not particularly limited so long as it is a compound containing an aromatic group and a polymerizable group. The aromatic group may be either a group derived from an aromatic hydrocarbon or a group derived from an aromatic heterocyclic ring. In the invention, the aromatic group is preferably an aromatic group derived from the aromatic hydrocarbon, from a viewpoint of the shape stability of particles in the aqueous medium.

The polymerizable group may be either a polycondensating polymerizable group or an addition polymerizing polymerizable group. In the invention, the polymerizable group is preferably an addition polymerizing polymerizable group, and more preferably, a group containing an ethylenically unsaturated bond from a viewpoint of shape stability of particles in the aqueous medium.

The aromatic group-containing monomer in the invention is preferably a monomer having an aromatic group derived from an aromatic hydrocarbon and an ethylenically unsaturated bond. The aromatic group-containing monomer may be used alone or two or more kinds of the monomers may be used in combination.

Examples of the aromatic group-containing monomer include phenoxyethyl(meth)acrylate, benzyl(meth)acrylate, phenyl(meth)acrylate, and styrenic monomer. Among them, from a viewpoint of the balance between the hydrophilicity and the hydrophobicity of the polymer chain and the ink fixing property, an aromatic group-containing (meth)acrylate monomer is preferred, and at least one selected from the group consisting of phenoxyethyl(meth)acrylate, benzyl(meth)acrylate, and phenyl(meth)acrylate is more preferably and, phenoxyethyl(meth)acrylate and benzyl(meth)acrylate are still more preferred.

"(Meth)acrylate" means acrylate or methacrylate, "(meth)acrylamide" means acrylamide or methacrylamide, and "(meth)acrylic" means acrylic or methacrylic.

The self-dispersing polymer particles in the invention preferably contain a constituent unit derived from the aromatic group-containing (meth)acrylate monomer and the content thereof is, preferably, from 10 mass % to 95 mass %. When the content of the aromatic group-containing (meth)acrylate monomer is from 10 mass % to 95 mass %, the stability of the self-emulsified or dispersed state is improved and, further, increase in the viscosity of an ink can be suppressed.

In the invention, the content of the aromatic group-containing (meth)acrylate monomer is, more preferably, from 15 mass % to 90 mass %, further preferably, from 15 mass % to 80 mass % and, particularly preferably, from 25 mass % to 70 mass % from a viewpoint of the stability of the self-dispersed state, stabilization for the shape of the particles in the aqueous medium due to hydrophobic inter-action between aromatic rings to each other, and lowering of the amount of the water-soluble component due to appropriate hydrophobic property of the particles.

The self-dispersing polymer particles in the invention can be formed by using, for example, a constituent unit derived from an aromatic group-containing monomer and a constituent unit derived from a dissociative group-containing monomer. The polymer particles may further contain other constituent units optionally.

The monomer which may be used for forming other constituent units is not particularly limited so long as it is a monomer copolymerizable with the aromatic group-containing monomer and the dissociative group-containing monomer. Among all, an alkyl group-containing monomer is preferred from a viewpoint of the flexibility of the polymer skeleton or easiness in control for the glass transition temperature (Tg).

Examples of the alkyl group-containing monomer include alkyl(meth)acrylates such as methyl(meth)acrylate, ethyl (meth)acrylate, isopropyl(meth)acrylate, n-propyl(meth) acrylate, n-butyl(meth)acrylate, isobutyl(meth)acrylate, t-butyl(meth)acrylate, hexyl(meth)acrylate, and ethylhexyl (meth)acrylate; ethylenically unsaturated monomers having a hydroxyl group such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, and hydroxyhexyl(meth)acrylate; dialkylamino alkyl (meth)acrylates such as dimethylaminoethyl(meth)acrylate; (meth)acrylamides, for example, N-hydroxyalkyl(meth) acrylamide such as N-hydroxymethyl(meth)acrylamide, N-hydroxyethyl(meth)acrylamide, and N-hydroxybutyl (meth)acrylamide; and N-alkoxyalkyl(meth)acrylamides such as N-methoxymethyl(meth)acrylamide, N-ethoxymethyl(meth)acrylamide, N-(n-,iso)butoxymethyl(meth)acrylamide, N-methoxyethyl(meth)acrylamide, N-ethoxyethyl (meth)acrylamide, and N-(n-,iso)butoxyethyl(meth) acrylamide.

The range for the molecular weight of the water-insoluble polymer that is used in the self-dispersing polymer particles in the invention is, preferably, from 3,000 to 200,000 and, more preferably, from 5,000 to 150,000 and, further preferably, from 10,000 to 100,000 as the weight average molecular weight. The amount of the water-soluble component can be suppressed effectively by defining the weight average molecular weight to 3,000 or more. Further, the self-dispersion stability can be increased by defining the weight average molecular weight to 200,000 or less.

The weight average molecular weight is measured by gel permeation chromatography (GPC). In GPC, HLC-8020GPC (manufactured by Tosoh Corporation) is used, and 3 pieces of TSKgel Super Multipore HZ-H (trade name, manufactured by Tosoh Corporation, 4.6 mm ID×15 cm) were used as the columns, and THF (tetrahydrofuran) is used as an eluate. Measurement is performed by using an IR detector under the conditions at a sample concentration of 0.35 mass %, a flow rate of 0.35 mL/min, a sample ejection amount of 10 μL, and a measuring temperature of 40° C. A calibration curve is prepared based on eight samples of "standard sample: TSK standard polystyrene" of "F-40", "F-20", "F-4", "F-1", "A-5000", "F-2500", "A-1000", and "n-propylbenzene" manufactured by Tosoh Corporation.

The water-insoluble polymer used for the self-dispersing polymer particle in the invention preferably contains a structural unit derived from an aromatic group-containing (meth) acrylate monomer (preferably, structural unit derived from phenoxyethyl(meth)acrylate and/or structural unit derived from benzyl(meth)acrylate) by from 15 to 80 mass % as the copolymerization ratio based on the entire mass of the self-dispersing polymer particles from a viewpoint of controlling the hydrophilicity and hydrophobicity of the polymer.

Further, the water-insoluble polymer preferably contains a constituent unit derived from an aromatic group-containing (meth)acrylate monomer by from 15 to 80 mass % as the copolymerization ratio, a constituent unit derived from a carboxyl group-containing monomer, and a constituent unit derived from an alkyl group-containing monomer (preferably, constituent unit derived from (meth)acrylic acid alkyl ester). The water-insoluble polymer more preferably contains a structural unit derived from phenoxyethyl(meth)acrylate and/or structural unit derived from benzyl(meth)acrylate by from 15 to 80 mass % as the copolymerization ratio, a constituent unit derived from a carboxyl group-containing monomer, and a constituent unit derived from an alkyl group-containing monomer (preferably, a structural unit derived from an ester of alkyl having 1 to 4 carbon atoms of (meth) acrylic acid). Further, the water-insoluble polymer has preferably an acid value of from 25 to 100 and a weight average molecular weight of from 3,000 to 200,000 and, more preferably, an acid value of from 25 to 95 and a weight average molecular weight of from 5,000 to 150,000, from a viewpoint of controlling the hydrophilicity and hydrophobicity of the polymer.

As specific examples of the water-insoluble polymer that is used in the self-dispersing polymer particle exemplary compounds B-01 to B-19 are shown below but the invention is not limited to them. Numericals described in each parenthesis represents the mass ratio of the copolymer components.

B-01: phenoxyethyl acrylate/methyl methacrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/ methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/ acrylic acid copolymer (10/50/35/5)

B-07: benzyl acrylate/methyl methacrylate/acrylic acid copolymer (55/40/5)

B-08: phenoxyethyl methacrylate/benzyl acrylate/methacylic acid copolymer (45/47/8)

B-09: styrene/phenoxyethyl acrylate/butyl methacrylate/ acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butyl acrylate/ acrylic acid copolymer (50/5/20/25)

B-14: styrene/butyl acrylate/acrylic acid copolymer (62/ 35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

The method of producing a water-insoluble polymer that is used in the self-dispersing polymer particle in the invention is not particularly limited. Examples of the method of producing the water-insoluble polymer include a method of performing emulsion polymerization under the presence of a polymerizable surfactant thereby covalently-bonding the surfactant and the water-insoluble polymer and a method of copolymerizing a monomer mixture containing the hydrophilic group-containing monomer and the aromatic group-containing monomer by a known polymerization method such as a solution polymerization method or a bulk polymerization method. Among the polymerization methods described above, the solution polymerization method is preferred and a solution polymerization method of using an organic solvent is more preferred from a viewpoint of aggregation rate and the stability of droplet ejection when formulated as an ink composition.

From a viewpoint of the aggregation rate, it is preferred that the self-dispersing polymer particles in the invention contain a polymer synthesized in an organic solvent, and the polymer has a carboxyl group (with acid value preferably from 20 to 100), in which the carboxyl groups of the polymer are partially or entirely neutralized and the polymer is prepared as a polymer dispersion in a continuous phase of water. That is, the self-dispersing polymer particle in the invention is prepared by a method including a step of synthesizing the polymer in the organic solvent and a dispersion step of forming an aqueous dispersion in which at least a portion of the carboxyl groups of the polymer is neutralized.

The dispersion step preferably includes the following step (1) and step (2).

Step (1): step of stirring a mixture containing a polymer (water-insoluble polymer), an organic solvent, a neutralizing agent, and an aqueous medium, Step (2): step of removing the organic solvent from the mixture.

The step (1) preferably a treatment that includes at first dissolving the polymer (water-insoluble polymer) in the organic solvent and then gradually adding the neutralizing agent and the aqueous medium, and mixing and stirring them to obtain a dispersion. By adding the naturalizing agent and the aqueous medium to the solution of the water-insoluble polymer dissolved in the organic solvent, self-dispersing polymer particles having a particle size that enables higher storage stability can be obtained without requiring strong sharing force.

The stirring method for the mixture is not particularly limited and a mixing and stirring apparatus that is used generally can be used, and optionally, a disperser such as a ultrasonic disperser or a high pressure homogenizer can be used.

Preferable examples of the organic solvent include alcohol type solvents, ketone type solvents and ether type solvents.

Examples of the alcohol type solvent include isopropyl alcohol, n-butanol, t-butanol, and ethanol. Examples of the ketone type solvent include acetone, methyl ethyl ketone, diethyl ketone, and methyl isobutyl ketone. Examples of the ether type solvent include dibutyl ether and dioxane. Among the solvents, the ketone type solvent such as methyl ethyl ketone and the alcohol type solvent such as propyl alcohol are preferred. Further, with an aim of moderating the change of polarity at the phase transfer from an oil system to an aqueous system, combined use of isopropyl alcohol and methyl ethyl ketone is also preferred. By the combined use of the solvents, self-dispersing polymer particles of small particle size with no aggregation settling or fusion between particles to each other and having high dispersion stability may be obtained.

The neutralizing agent is used to partially or entirely neutralize the dissociative groups so that the self-dispersing polymer can form a stable emulsified or dispersed state in water. In a case where the self-dispersing polymer of the invention has an anionic dissociative group (for example, carboxyl group) as the dissociative group, examples of the neutralizing agent to be used include basic compounds such as organic amine compounds, ammonia, and alkali metal hydroxides. Examples of the organic amine compounds include monomethyl amine, dimethyl amine, trimethyl amine, monoethyl amine, diethyl amine, triethyl amine, monopropyl amine, dipropyl amine, monoethanol amine, diethanol amine, triethanol amine, N,N-dimethyl-ethanol amine, N,N-diethyl-ethanol amine, 2-diethylamino-2-methyl-1-propanol, 2-amino-2-methyl-1-propanol, N-methyldiethanol amine, N-ethyldiethanol amine, monoisopropanol amine, diisopropanol amine, and triisopropanol amine, etc. Examples of the alkali metal hydroxide include lithium hydroxide, sodium hydroxide and potassium hydroxide. Among them, sodium hydroxide, potassium hydroxide, triethylamine, and triethanol amine are preferred from a viewpoint of the stabilization of dispersion of the self-dispersing polymer particles of the invention into water.

The basic compound is used preferably in an amount of from 5 to 120 mol % and, more preferably, by from 10 to 110 mol % and, further preferably, by from 15 to 100 mol % relative to 100 mol % of the dissociative groups. When the basic compound is used in an amount of 15 mol % or more, the effect of stabilizing the dispersion of the particles in water may be obtained and when the basic compound is in an amount of 100% or less, the effect of decreasing the water-soluble component may be provided.

In the step (2), an aqueous dispersion of the self-dispersing polymer particles can be obtained by phase transfer to the aqueous phase by distilling off the organic solvent from the dispersion obtained in the step (1) by a common method such as distillation under a reduced pressure. In the obtained aqueous dispersion, the organic solvent has been substantially removed and the amount of the organic solvent is preferably from 0.2 mass % or less and, more preferably, 0.1 mass % or less.

The average particle diameter of the polymer particles (particularly, self-dispersing polymer particles) is, preferably, in a range from 10 to 400 nm, more preferably in a range from 10 to 200 nm, further preferably, in a range from 10 to 100 nm and, particularly preferably, in a range from 10 to 50 nm as the volume average particle diameter. The production adaptability may be improved when the average particle diameter is 10 nm or more. The storage stability may be improved when the average particle diameter is 400 nm or less. The particle diameter distribution of the polymer particles is not particularly limited and it may be either a wide particle diameter distribution or a monodisperse particle diameter distribution. Further, two or more kinds of water-insoluble particles may be used in admixture.

The average particle diameter and the particle diameter distribution of the polymer particles can be determined by measuring the volume average particle diameter by means of a dynamic light scattering method using a particle size distribution measuring apparatus NANOTRACKUPA-EX150 (manufactured by Nikkiso Co. Ltd.).

The content of the polymer particles (particularly, self-dispersing polymer particles) in the liquid composition is, preferably, from 1 to 30 mass % and, more preferably, from 5 to 15 mass % relative to the liquid composition, from a viewpoint of the glossiness of an image.

The polymer particles (particularly, self-dispersing polymer particles) can be used alone or two or more kinds of the polymer particles can be used in admixture.

(Hydrophilic Organic Solvent)

The liquid composition in the invention contains water as a solvent and it further contains at least one hydrophilic organic solvent. Since the liquid composition includes the hydrophilic organic solvent, drying may be prevented and permeation may be accelerated. In a case of using the hydrophilic organic solvent as a drying inhibitor, it is possible to effectively prevent clogging of nozzles which may be generated by drying of an ink at an ink ejection port when the liquid composition is ejected by an ink-jet method for image recording.

A hydrophilic organic solvent having vapor pressure lower than that of water may be preferably used for prevention of drying. Specific examples of the hydrophilic organic solvent include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylolpropane; lower alkyl ethers of polyhydric alcohol, such as ethylene glycol monomethyl (or ethyl) ether, diethylene glycol monomethyl (or ethyl) ether and triethylene glycol monoethyl (or butyl) ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethylsufoxide and 3-sulforene; polyfunctional compounds such as diacetone alcohol and diethanolamine; and urea derivatives.

Among the hydrophilic organic solvents, polyhydric alcohols such as glycerin and diethylene glycol are preferred. Those hydrophilic organic solvents may be used alone or as mixtures of two kinds or more thereof. Those hydrophilic organic solvents are preferably contained in an amount of from 10 to 50% by mass in the liquid composition.

In order to accelerate permeation, hydrophilic an organic solvent is preferably used for the purpose of well permeating the liquid composition into a recording medium. Specific examples of the organic solvent which may be preferably used for accelerating permeation include alcohols such as ethanol, isopropanol, butanol, di(tri)ethylene glycol monobutyl ether and 1,2-hexanediol; sodium lauryl sulafate, sodium oleate and nonionic surfactants. When such hydrophilic organic solvent(s) are contained in the liquid composition in an amount of from 5 to 30% by mass, sufficient effect may be exhibited. The hydrophilic organic solvent is preferably used within a range of the addition amount such that bleeding of printing and print-through are not generated.

The hydrophilic organic solvent can be used to adjust viscosity, other than the above. Specific examples of the hydrophilic organic solvent that can be used to adjust viscosity include alcohols (for example, methanol, ethanol, propanol, isopropanol, butanol, isobutanol, sec-butanol, t-butanol, pentanol, hexanol, cyclohexanol and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amines (for example, ethanolamine, diethanolamine, triethanolamine, N-methyl diethanolamine, N-ethyl diethanolamine, morpholine, N-ethylmorpholine, ethylene diamine, diethylene triamine, triethylene tetramine, polyethylene imine and tetramethylpropylene diamine), and other polar solvents (for example, formaldehyde, N,N-dimethylformamide, N,N-dimethylacetamide, diemthylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

The hydrophilic organic solvent may be used alone or as mixtures of two kinds or more thereof.

(Surfactant)

The liquid composition in the invention contains at least one surfactant. The surfactant is used as a surface tension regulator. Examples of the surface tension regulator include nonionic surfactants, cationic surfactants, anionic surfactants, and betain surfactants.

For improving the ink droplet ejection by the ink-jet method, the surfactant is preferably contained in such an amount that the surface tension of the liquid composition can be controlled to 20 to 60 mN/m. The content of the surfactant is more preferably in an amount capable of controlling the surface tension to 20 to 45 mN/m and, more preferably, in an amount capable of controlling the surface tension to 25 to 40 mN/m.

The surface tension of the liquid composition is measured by a plate method under the condition at 25° C. using Automatic Surface Tensiometer: CBVP-Z (manufactured by Kyowa Interface Science Co. Ltd.).

Specific examples of the surfactant as a hydrocarbon type preferably include anionic surfactants such as fatty acid salts, alkyl sulfate ester salts, alkyl benzene sulfonates, alkyl naphthalene sulfonates, dialkyl sulfosuccinates, alkyl phosphate ester salts, naphthalenesulfonic acid-formalin condensates and polyoxyethylene alkyl sulfate ester salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. SURFYNOLS (trade name, products of Air Products & Chemicals) which are an acetylene type polyoxyethylene oxide surfactant are preferably used. Furthermore, amine oxide type amphoteric surfactants such as N,N-dimethyl-N-alkyl amine oxide are preferred.

Additionally, materials described on pages (37) to (38) of JP-A No. 59-157636 and Research Disclosure No. 308119 (1989) as surfactants can be used.

When fluorine (alkyl fluoride type) surfactants, silicone surfactants and the like, such as those described in JP-A Nos. 2003-322926, 2004-325707 and 2004-309806 are used, scratch fastness can be improved.

The surface tension regulator can be used as a defoamer, and fluorine compounds, silicone compounds, chelating agents represented by EDTA, and the like can be used.

(Water)

The liquid composition used in the invention includes water. There is no limitation for the content of water. The liquid composition may preferably contains water in an amount of 10 to 99% by mass, more preferably 30 80% by mass, and still more preferably 50 to 70% by mass.

(Coloring Material)

The liquid composition used in the invention may contain at least one kind of coloring material. By using the liquid composition containing the coloring material, visible images can be formed. As the coloring material, any one of conventional dyes, pigments and the like may be used without particular limitation. Among the coloring materials, a coloring material that is substantially insoluble or sparingly soluble in water is preferred from the standpoint of ink coloring properties. Specific examples of the coloring material include various pigments, disperse dyes, oil-soluble dyes and dyestuffs forming J aggregate. Pigments are more preferred.

In the invention, the water-insoluble pigment itself or the pigment itself surface-treated with a dispersant can be used as the water-insoluble colored particles.

The pigment that may be used in the invention is not particularly limited in its kind, and any one of the known organic pigments and known inorganic pigments may be used. Examples of the pigment that may be used include polycyclic pigments such as an azo lake, an azo pigment, a phthalocyanine pigment, a perylene pigment and a perynone pigment, an anthraquinone pigment, a quinacridone pigment, a dioxadine pigment, a diketopyrrolopyrrole pigment, a thioindigo pigment, an isoindoline pigment and a quinophthalone pigment; dye lakes such as basic dye type lakes and acidic dye type lakes; organic pigments such as a nitro pigment, a nitroso pigment, aniline black and a daylight fluorescent pigment; and inorganic pigments such as titanium oxide, iron oxide type and carbon black type. Even pigments that are not described in Color Index can be used so long as it is a pigment capable of being dispersed in an aqueous phase. Furthermore, those obtained by surface treating the above-described pigments with a surfactant, a polymeric dispersant or the like, and grafted carbon can also be used.

Among those pigments, an azo pigment, a phthalocyanine pigment, an anthraquinone pigment, a quinacridone pigment and a carbon black type pigment are preferably used.

Specific examples of the organic pigment that may be used in the invention will be described below.

Examples of the organic pigment for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180 and C.I. Pigment Yellow 185.

Examples of the organic pigment for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and C.I. Pigment Violet 19.

Examples of the organic pigment for green or cyan include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and siloxane-crosslinked aluminum phthalocyanine described in U.S. Pat. No. 4,311,775.

Examples of the organic pigment for black include C.I. Pigment Black 1, C.I. Pigment Black 6 and C.I. Pigment Black 7.

(Dispersant)

When a pigment is used as the coloring material, the pigment is preferably dispersed in an aqueous solvent by a dispersant. The dispersant may be a polymer dispersant, or a low molecular surfactant type dispersant. The polymer dispersant may be either one of a water-soluble dispersant or a water-insoluble dispersant.

The low molecular-weight surfactant type dispersant (hereinafter sometimes referred to as a "low molecular-weight dispersant") can be added for the purpose of stably dispersing the organic pigment in a water solvent while maintaining an ink in low viscosity. The low molecular-weight dispersant used herein means a low molecular-weight dispersant having a molecular weigh of 2,000 or lower. The molecular weight of the low molecular-weight dispersant is preferably from 100 to 2,000, and more preferably from 200 to 2,000.

The low molecular-weight dispersant has a structure containing a hydrophilic group and a hydrophobic group. At least one of each of the hydrophilic group and the hydrophobic group may be independently contained in one molecule, and the low molecular-weight dispersant may have plural kinds of the hydrophilic group and the hydrophobic group. The low molecular-weight dispersant can appropriately have a linking group for linking the hydrophilic group and the hydrophobic group.

Examples of the hydrophilic group include an anionic group, a cationic group, a nonionic group, and a betaine type combining those.

The anionic group is not particularly limited so long as it has a negative charge. A phosphoric acid group, a phosphonic acid group, a phosphinic acid group, a sulfuric acid group, a sulfonic acid group, a sulfinic acid group and a carboxyl group are preferred, a phosphoric acid group and carboxyl group are more preferred, and a carboxyl group is further preferred.

The cationic group is not particularly limited so long as it has a positive charge. An organic cationic substituent is preferred, a cationic group containing nitrogen or phosphorus is more preferred, and a cationic group having nitrogen is further preferred. Above all, pyridinium cation and ammonium cation are particularly preferred.

The nonionic group is not particularly limited so long as it does not have negative or positive charge. Examples of the nonionic group include polyalkylene oxide, polyglycerin and a part of sugar unit It is preferred in the invention that the hydrophilic group is an anionic group from the standpoints of dispersion stability and aggregation properties of a pigment.

When the low molecular-weight dispersant has an anionic hydrophilic group, its pKa is preferably 3 or more from the standpoint of contacting with an acidic treating liquid to accelerate an aggregation reaction. The pKa of the low molecular-weight dispersant herein is a value experimentally obtained from a titration curve by titrating a liquid obtained dissolving 1 mmol/liter of a low molecular-weight dispersant in a tetrahydrofuran-water=3:2 (V/V) solution, with an acid or alkali aqueous solution.

Theoretically, when pKa of a low molecular-weight weight dispersant is 3 or more, 50% or more of anionic groups are in a non-dissociation state when contacted with a treating liquid having a pH of about 3. Therefore, water solubility of the low molecular-weight weight dispersant is remarkably decreased, and an aggregation reaction occurs. In other words, aggregation reactivity is improved. From this standpoint, it is preferred that the low molecular-weight dispersant has a carboxylic group as an anionic group.

On the other hand, the hydrophobic group may have any structure of hydrocarbon type, fluorocarbon type, silicone type and the like, and the hydrocarbon type is particularly preferred. Those hydrophobic groups may have any of a linear structure and a branched structure. The hydrophobic group may have one chain structure or two or more chain structure. Where the structure has two or more chains, the structure may have plural kinds of hydrophobic groups.

The hydrophobic group is preferably a hydrocarbon group having from 2 to 24 carbon atoms, more preferably a hydrocarbon group having from 4 to 24 carbon atoms, and further preferably a hydrocarbon group having from 6 to 20 carbon atoms.

Of the polymer dispersants, a hydrophilic polymer compound may be used as the water-soluble dispersant. Examples of a natural hydrophilic polymer compound include vegetable polymers such as gum Arabic, gum tragacanth, gum guar, gum karaya, locust bean gum, arabinogalactan, pectin and quince seed starch; seaweed polymers such as alginic acid, carrageenan and agar; animal polymers such as gelatin, casein, albumin and collagen; and microbial polymers such as xanthene gum and dextran.

Examples of a chemically modified hydrophilic polymer compound using a natural product as a raw material include cellulose polymers such as methyl cellulose, ethyl cellulose, hydroxyethyl cellulose, hydroxypropyl cellulose and carboxymethyl cellulose; starch polymers such as starch sodium glycolate and starch sodium phosphate ester; and seaweed polymers such as propylene glycol alginate ester.

Examples of a synthetic water-soluble polymer compound include vinyl polymers such as polyvinyl alcohol, polyvinyl pyrrolidone and polyvinyl methyl ether; acrylic resins such as polyacrylamide, polyacrylic acid or its alkali metal salt, and water-soluble styrene acrylic resin; water-soluble styrene maleic acid resins; water-soluble vinylnaphthalene acrylic resins; water-soluble vinylnaphthalene maleic resins; polyvinyl pyrrolidone, polyvinyl alcohol, alkali metal salts of β-naphthalenesulfonic acid formalin condensate; and polymer compounds having a salt of a cationic functional group such as quaternary ammonium or amino group at a side chain thereof.

Of those, a polymer compound containing a carboxyl group is preferred from the standpoints of dispersion stability and aggregation properties of pigment. Polymer compounds containing a carboxyl group, such as acrylic resins such as water-soluble styrene acrylic resin; water-soluble styrene maleic resin; water-soluble vinylnaphthalene acrylic resin; and water-soluble vinylnaphthalene maleic acid resin are particularly preferred.

Of the polymer dispersants, as a non-water-soluble dispersant, a polymer having both a hydrophilic moiety and a hydrophobic moiety may be used. Examples of such a polymer include styrene-(meth)acrylic acid copolymer, styrene-(meth)acrylic acid-(meth)acrylic acid ester copolymer, (meth)acrylic acid ester-(meth)acrylic acid copolymer, polyethylene glycol (meth)acrylate-(meth)acrylic acid copolymer and styrene-maleic acid copolymer.

The polymer dispersant may have a weight average molecular weight of preferably from 3,000 to 200,000, more preferably from 5,000 to 100,000, further preferably from 5,000 to 80,000, and particularly preferably from 10,000 to 60,000.

The weight average molecular weight can be measured with gel permeation chromatograph (GPC).

Mixing mass ratio of a pigment and a dispersant (pigment: dispersant) is preferably in a range of from 1:0.06 to 1:3, more preferably in a range of from 1:0.125 to 1:2, and further preferably in a range of from 1:0.125 to 1:1.5.

When a dye is used as the coloring material, a material in which a water-insoluble carrier supporting a dye can be used as water-insoluble colored particles. As the dye, conventional dyes may be used without particular limitation. For example, dyes described in JP-A No. 2001-115066, JP-A No. 2001-335714 and JP-A No. 2002-249677 can preferably be used in the invention. The carrier used is not particularly limited so long as it is insoluble or sparingly soluble in water, and inorganic materials, organic materials and their composite materials can be used. Specifically, carriers described in, for example, JP-A No. 2001-181549 and JP-A No. 2007-169418 can preferably be used in the invention.

The carrier supporting a dye (water-insoluble colored particles) can be used as an aqueous dispersion using a dispersant. As the dispersant, any of the dispersants described hereinabove can be preferably used.

From the standpoints of light resistance and quality of an image, the coloring material preferably contains a pigment and a dispersant, more preferably contains an organic pigment and a polymer dispersant, and particularly preferably contains an organic pigment and a polymer dispersant containing a carboxylic group. Further, the coloring material is preferably coated with a polymer dispersant containing a carboxyl group from the viewpoint of the aggregation properties, and is also preferably water-insoluble.

Moreover, the polymer dispersant preferably has an acid value higher than that of the polymer particles.

The coloring material has an average particle diameter of preferably from 10 to 200 nm, more preferably from 10 to 150 nm, and further preferably from 10 to 100 nm. When the average particle diameter is 200 nm or less, color reproducibility becomes better, and in the case of an inkjet method, droplet ejection properties become better. Furthermore, when the average particle diameter is 10 nm or more, light resistance becomes better.

Particle size distribution of the coloring material is not particularly limited, and may be any of wide particle size distribution and monodisperse particle size distribution. A mixture of two kinds or more of coloring materials having monodisperse particle size distribution may be used.

The average particle diameter and the particle size distribution of the coloring materials can be measured using, for example, a light scattering method.

From the standpoint of image density, the content of the coloring material is preferably from 1 to 25% by mass, more preferably from 2 to 20% by mass, further preferably from 5 to 20% by mass, and particularly preferably from 5 to 15% by mass, based on the mass of the liquid composition.

The coloring material may be used in a single kind or as mixtures of two or more kinds thereof.

The content ratio of the coloring material and the polymer particles (preferably self-dispersing polymer particles) (the ratio coloring material/polymer particles) is preferably 1/0.5 to 1/10, and more preferably 1/1 to 1/4.

(Other Additives)

The liquid composition used in the invention may contain other additives, in addition to the components as described above. Examples of other additives that may be used in the invention include conventional additives such as color fading inhibitor, emulsion stabilizer, permeation accelerator, ultraviolet absorber, preservative, mildew-proofing agent, pH regulator, surface tension regulator, defoamer, viscosity regulator, dispersant, dispersion stabilizer, anti-rust agent and chelating agent. Those various additives may directly be added after preparation of the liquid composition, or may be added at the time of preparation of the liquid composition.

The ultraviolet absorber is used for the purpose of improving preservability of an image. The ultraviolet absorber can use benzotriazole compounds described in, for example, JP-A Nos. 58-185677, 61-190537, 2-782, 5-197075 and 9-34057; benzophenone compounds described in, for example, JP-A Nos. 46-2784 and 5-194483, and U.S. Pat. No. 3,214,463; cinnamic acid compounds described in, for example, JP-B Nos. 48-30492 and 56-21141, and JP-A No. 10-88106; triazine compounds described in, for example, JP-A Nos. 4-298503, 8-53427, 8-239368 and 10-182621, and JP-A No. 8-501291; compounds described in Research Disclosure No. 24239; and compounds that absorb ultraviolet light and emit fluorescence, i.e., fluorescent brighteners, represented by stilbene compounds or benzoxazole compounds.

The color fading inhibitor is used for the purpose of improving storability of an image. Examples of the color fading inhibitor that can be used include various organic color fading inhibitors and metal complex color fading inhibitors. Examples of the organic color fading inhibitor include hydroquinones, alkoxyphenols, dialkoxyphenols, phenols, anilines, amines, indanes, chromanes, alkoxyanilines and heterocycles. Examples of the metal complex color fading inhibitor include a nickel complex and a zinc complex. More specifically, compounds described in the patents cited in Research Disclosure No. 17643, chapter VII, items I to J; Research Disclosure No. 15162: Research Disclosure No. 18716, page 650, the left-hand column; Research Disclosure No. 36544, page 527; Research Disclosure No. 307105, page 872; and Research Disclosure No. 15162, and compounds included in the formulae of the representative compounds and the exemplified compounds described on pages 127 to 137 of JP-A No. 62-215272 can be used.

Examples of the mildew-proofing agent include sodium dehydroacetate, sodium benzoate, sodium pyridinethion-1-oxide, p-hydroxybenzoic acid ethyl ester, 1,2-benzisothiazolin-3-one and its salt. Those are preferably used in the liquid composition in an amount of from 0.02 to 1.00% by mass.

As the pH regulator, a neutralizer (an organic base, an inorganic alkali) may be used. The pH regulator may be added in an amount such that the liquid composition has pH of preferably from 6 to 10, and more preferably from 7 to 10, for the purpose of improving storage stability of the liquid composition.

As the pH regulator, a neutralizer (an organic base, an inorganic alkali) can be used. The pH regulator may be added such that the pH of the liquid composition is preferably from 6 to 10 and, more preferably added such that the pH is 7 to 10, from a viewpoint of improving the storage stability of the liquid composition.

With a view point of ejection stability when the liquid composition is ejected by the ink-jet method and the aggregation rate when the liquid composition is used with the treating liquid to be described later, the viscosity of the liquid composition in the invention is preferably, in a range from 1 to 30 mPa·s, more preferably, in a range from 1 to 20 mPa·s, further preferably, in a range from 2 to 15 mPa·s and, particularly preferably, in a range from 2 to 10 mPa·s, The viscosity of the liquid composition is measured by using VISCOMETER TV-22 (manufactured by TOKI SANGYO CO. LTD.) under the condition at 20° C.

—Heating and Pressurizing Step—

The ink-jet recording method of the invention preferably include, after recording an image in the ejection step, applying at least a heating treatment or a heating and pressurizing treatment to the recorded image. By applying the heating treatment or heating and pressurizing treatment, the image may be fixed on a recording medium and scratch resistance of the image can be improved further.

The heating treatment is preferably applied at a temperature equal to or higher than the glass transition temperature (Tg) of the polymer particles in the image. Since the polymer particles are heated to a temperature equal to or higher than the glass transition temperature (Tg), they can be formed into a film to strengthen the image. The heating temperature is, preferably, in a temperature range of Tg+10° C. or higher. Specifically, the heating temperature is preferably in a range from 40 to 150° C., more preferably, in a range from 50 to 100° C. and, further preferably, in a range from 60 to 90° C.

Further, in a case of applying pressurization together with heating, the pressure is preferably in a range from 0.1 to 3.0 MPa, more preferably, in a range from 0.1 to 1.0 MPa and, further preferably, in a range from 0.1 to 0.5 MPa from a viewpoint of the surface smoothness.

The method of heating treatment, or heating and pressurizing treatment is not particularly limited. Preferable examples thereof include a method of pressing a hot plate to an image forming surface of a recording medium, or a method of using a heating and pressurizing device having a pair of heating and pressurizing rollers, a pair of heating and pressurizing belts, or a heating and pressurizing belt disposed on the side of an image recording surface of a recording medium and a retaining roller disposed on the side opposite thereto and passing the medium between paired rollers, etc.

In a case of applying heat and pressure, a preferred nip time is from 1 msec to 10 sec, more preferably, from 2 msec to 1 sec and, further preferably, from 4 msec 100 sec. Further, a nip width is, preferably, from 0.1 mm to 100 mm, more preferably, from 0.5 mm to 50 mm and, further preferably, from 1 to 10 mm.

The heating and pressurizing roller may be either a metal roller made of metal, or a roller having a core metal made of metal and a cover layer including an elastic member and, optionally, a surface layer (also referred to a releasing layer) provided at the periphery thereof. The latter core metal can be formed, for example, of a cylindrical member made of iron, aluminum, SUS, or the like and the surface of the core metal is preferably covered at least partially with a cover layer. Particularly, the cover layer is formed preferably of a silicone resin or a fluoro resin having releasability.

Further, a heat generating member preferably is incorporated to the inside of the core metal for one of the heating and pressurizing rollers, and the recording medium may be heated by applying the heating treatment and the pressurizing treatment simultaneously by passing the medium between the rollers or, optionally, by sandwiching the recording medium using two heating rollers. As the heating member, a halogen lamp heater, a ceramic heater, a nichrome wire, or the like is preferred.

As a belt substrate which is used in the heating and pressurizing belt used for the heating and pressurizing device, a seamless electrocast nickel substrate is preferred and the thickness of the substrate is preferably from 10 to 100 µm. Further, for the material of the belt substrate, aluminum, iron, polyethylene, or the like can be used, as well as nickel.

In a case of disposing a silicone resin or a fluoro resin, the thickness of the layer formed by using such a resin is, preferably, from 1 to 50 µm and, more preferably, from 10 to 30 µm.

The pressure (nip pressure) may be attained, for example, by selecting a resilient member such as a spring having a tension and disposing the resilient member on both roller ends of the heating and pressurizing rollers such that a desired nip pressure is obtained taking the nip gap into consideration.

The transporting speed of the recording medium in a case of using the heating and pressurizing roller or the heating and pressurizing belt is, preferably, in a range from 200 to 700 mm/sec, more preferably, from 300 to 650 mm/sec and, further preferably, from 400 to 600 mm/sec.

—Treating Liquid Applying Step—

In the ink-jet recording method of the invention may include a step of applying a treating liquid that enables formation of an aggregate at the liquid composition when the treating liquid is in contact with the liquid composition described above on the recording medium before or after the ejection step described above using the liquid composition (hereinafter also referred to as "treating liquid applying step"), thereby bringing the liquid composition into contact with the treating liquid to record an image. In this case, when the treating liquid is in contact with a liquid composition containing a pigment, for example, as a coloring material, the pigment in the liquid composition is aggregated and the image is fixed on the recording medium.

The treating liquid contains at least an aggregating ingredient capable of aggregation of particles such as of a pigment in the liquid composition when the treating liquid is in contact with the liquid composition, whereby an aggregates can be formed. The treating liquid may contain other ingredients as necessary.

(Aggregating Ingredient)

The treating liquid contains at least one aggregating ingredient that can cause an aggregate to be formed when the treating liquid is in contact with the liquid composition. By bringing the treating liquid into contact with the liquid composition ejected by the ink-jet method, the pigment or the like dispersed stably in the liquid composition may be aggregated.

Examples of the treating liquid include a liquid capable of forming an aggregate at the liquid composition by changing the pH of the liquid composition. The pH of the treating liquid (at 25° C.) is, preferably, from 1 to 6, more preferably, from 2 to 5 and, further preferably, from 3 to 5, from a viewpoint of the aggregation rate of the liquid composition. In this case, the pH of the liquid composition (at 25° C.) used in the ejection step is, preferably, 7.5 or higher (more preferably, 8 or higher).

Among all, in the invention, it is preferred that the pH of the liquid composition (at 25° C.) is 7.5 or higher and the pH of the treating liquid (at 25° C.) is preferably from 3 to 5, from a viewpoint of the image density, the resolution and increase in the ink-jet recording speed.

The aggregating ingredient can be used alone or two or more kinds of ingredients can be used in admixture.

The treating liquid can be formed by using at least one acidic compound as the aggregating ingredient. Examples of the acidic compound usable herein include compounds having a phosphoric acid group, a phosphonic acid group, a phosphinic acid group, a sulfuric acid group, a sulfonic acid group, a sulfinic acid group, or a carboxylic acid group, and salts thereof (for example, polyvalent metal salts). Among them, from a viewpoint of the aggregation rate of the aqueous ink composition, compounds having a phosphoric acid group or a carboxylic acid group are more preferred and compounds having a carboxylic group are further preferred.

The compound having a carboxyl group is preferably selected from polyacrylic acid, acetic acid, glycoric acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrole carboxylic acid, furan carboxylic acid, pyridine carboxylic acid, coumalic acid, thiophene carboxylic acid, nicotinic acid, or derivatives of such compound or salts thereof (for example, polyvalent metal salts, etc.) One kind of these compounds may be used alone or two or more kinds of these compounds may be used together.

The treating liquid in the invention may further include an aqueous solvent (for example, water) in addition to the acidic compound described above.

The content of the acidic compound of the treating liquid is, preferably, from 5 to 95 mass % and, more preferably, from 10 to 80 mass % based on the entire mass of the treating liquid from a viewpoint of aggregation effect.

Preferred examples of the treating liquid that may improve the high speed aggregation property include a treating liquid including a polyvalent metal salt or a polyallyl amine. Examples of the polyvalent metal salt and a polyallyl amine include salts of alkaline earth metals belonging to group 2 of the periodic table (for example, magnesium and calcium), salts of a transition metal belonging to group 3 of the periodic table (for example, lanthan), salts of a cation of a metal belonging to group 13 of the periodic table (for example, aluminum), salts of a lanthanide (for example, neodium), polyallylamine and polyallylamine derivatives. As the metal salts, carboxylic acid salts (such as, salts formic acid, salts of acetic acid, and salts of benzoic acid salts), nitric acid salts, chlorides, and thiocyanic acid salts are preferred, and calcium salts or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid or magnesium salt of thiocyanic acid are more preferred.

The content of the metal salt in the treating liquid is preferably from 1 to 10 mass %, more preferably, from 1.5 to 7 mass % and, further preferably, from 2 to 6 mass %.

The viscosity of the treating liquid is, preferably, in a range from 1 to 30 mPa·s, more preferably, in a range from 1 to 20 mPa·s, further preferably, in a range from 2 to 15 mPa·s, and, particularly preferably, in a range from 2 to 10 mPa·s from a viewpoint of the aggregation rate of the liquid composition. The viscosity is measured by using VISCOMETER TV-22 (manufactured by TOKI SANGYO CO. LTD.) under the condition at 20° C.

The surface tension of the treating liquid is, preferably, from 20 to 60 mN/m, more preferably, from 20 to 45 mN/m and, further preferably, from 25 to 40 mN/m from a viewpoint of the aggregation rate of the liquid composition. The surface tension is measured by using Automatic Surface Tensiometer CBVP-Z (manufactured by Kyowa Interface Science Co. Ltd.) under the condition at 25° C.

In an embodiment of the ink-jet recording method, ejecting the liquid composition (the ejection step) is preferably conducted after applying a treating liquid (the treating liquid applying step). That is, in an embodiment, the treating liquid for aggregating the liquid composition (particularly, particles of a pigment or the like contained in the liquid composition) is applied on a recording medium before the liquid composition is applied on the recording medium, and applying the liquid composition so as to be in contact with the treating system applied on the recording medium thereby forming an image. This can increase ink-jet recording speed and provide an image of high density and resolution even at high speed recording.

The ink-jet recording method of the invention may be a method as follows. That is, in an embodiment, the liquid composition of the invention is applied onto an intermediate transfer body that is used as a recording medium on which an image is recorded at first, by an ink-jet method (an ink applying step or an ejection step), and a treating liquid that is capable of formation of an aggregate at the liquid composition when the treating liquid is in contact with the liquid composition is applied onto the intermediate transfer body (a treating liquid applying step), and after contacting the liquid composition with the treating liquid to form an image on the intermediate transfer body, the image formed on the intermediate transfer body is transferred to a desired final recording medium (a transfer step). Also in this case, an embodiment in which ejecting the liquid composition (the ejection step) is conducted after applying the treating liquid (the treating liquid applying step) is preferred.

An example of forming an image by an ink-jet recording method of the invention will be described in detail with reference to FIG. 1.

FIG. 1 is a schematic constitutional view showing the entire constitution of an ink-jet recording apparatus.

The ink-jet recording apparatus shown in FIG. 1 includes a treating liquid applying part 12 having a treating liquid ejection head 12S for ejecting a treating liquid, a treating liquid drying zone 13 having heating means (not illustrated) for drying the applied treating liquid, an ink ejection part 14 for ejecting various kinds of aqueous inks, an ink drying zone 15 for drying the ejected aqueous ink successively toward the direction of transporting a recording medium (direction of an arrow in the drawing). Further, an image fixing part 16 for fixing an image on the recording medium is disposed at a downstream of the ink drying zone 15 in the direction of transporting the recording medium.

The recording medium supplied to the ink-jet recording apparatus is conveyed from a paper feed part for feeding a recording medium from a casing in which the recording medium is loaded, by way of conveyor rolls, through the treating liquid applying part 12, the treating liquid drying zone 13, the ink ejection part 14, and the ink drying zone 15 successively and, if necessary through the image fixing part 16 at which the recording medium is subjected to a fixing treatment, to an accumulation part. For the transportation, a drum conveying system using a drum member, a belt conveyor system, a stage conveyor method using a stage may be employed as well as the method by the conveyor rollers.

Among the conveyor rollers disposed in plurality, at least one roller can be a driven roller which receives power transmitted from a motor (not illustrated). By rotating the driven roller rotated by the motor at a constant speed, a predetermined conveying amount of the recording medium is conveyed in a predetermined direction.

The treating liquid applying part 12 is provided with a treating liquid ejection head 12S that is connection to a storage tank for storing the treating liquid. The treating liquid ejection head 12S is capable of ejecting the treating liquid from an ejection nozzle disposed being opposed to the recording surface of the recording medium, so that the treating liquid can be applied by droplet ejection to the recording medium. The treating liquid applying part 12 is not limited only to the system of ejecting the liquid from a nozzle-like head, but a coating system of using a coating roller may be employed for application the treating liquid. When employing the coating system, the treating liquid may easily be applied substantially over the entire surface including an image region where the ink droplets deposit on the recording medium by the ink ejection part 14 disposed to the downstream. For making the thickness of the treating liquid constant on the recording medium, it may be adopted a method of using an air knife, or disposing a member having a sharp corner with a gap corresponding to the prescribed amount of the treating liquid being formed relative to the recording medium, for example.

At the downstream in the direction of transporting the recording medium of the treating liquid applying part 12, the treating liquid drying zone 13 is disposed. The treating liquid drying zone 13 can be configured by using known heating means such as a heater, a blowing means utilizing a blow of a drier or the like, or combinations of two or more thereof. The heating means may be, for example, a system in which a heat generating member such as a heater is disposed on the side opposite to a barrier layer forming surface of the recording medium (for example, below a conveying mechanism for conveying a recording medium carried thereon in a case of automatically transporting the recording medium), a system in which a warm blow or a hot blow is applied to the blocking layer forming surface of the recording medium, or a heating system in which an infrared heater is used. The heating means may be a combination of two or more of the above.

Further, since the surface temperature of the recording medium varies depending on the kind of the recording medium (material, thickness, etc.) or circumstantial temperature, etc., it is preferred to provide a measuring part for measuring the surface temperature of the recording medium and a control mechanism for feeding back the value of the measured surface temperature of the recording medium to the heating control parts, thereby controlling the temperature, and also to form the blocking layer. A contact or non-contact type thermometer is preferred as the measuring part for measuring the surface temperature of the recording medium.

Further, a solvent removing roller or the like may be used for removing the solvent. A system of removing an excess solvent from the recording medium by an air knife may be used in an embodiment.

The ink ejection part 14 is disposed at the downstream of the treating liquid drying zone 13 in the direction of transporting the recording medium. In the ink-jet part 14, recording heads (ink ejection heads) 30C, 30M, 30Y and 30K connected respectively to ink storing sections for storing inks of respective colors of cyan (C), magenta (M), yellow (Y), and black (K) are disposed. An aqueous ink (liquid composition) containing a pigment corresponding to each hue, polymer particles, a hydrophilic organic solvent, a surfactant, and water is stored in each of the ink storing sections (not illustrated), and supplied to each of ink ejection heads 30C, 30M, 30Y, 30K when recording an image as necessary.

The ink ejection heads 30C, 30M, 30Y, and 30K eject inks corresponding to an image respectively from the ejection nozzles disposed being opposed to the recording surface of the recording medium. Inks of respective colors are applied on the recording surface of the recording medium thereby recording a colored image.

The treating liquid ejection head 12S, as well as ink ejection heads 30K, 30C, 30M, and 30Y are each configured as a full line head where a plurality of ejection ports (nozzles) are arranged over a maximum recording width of an image (maximum recording width) to be recorded on the recording medium. Image recording can be performed at a higher speed to the recording medium compared with case of a serial type that performs recording while a short shuttle head reciprocally scans in the lateral direction of the recording medium (direction perpendicular to the transporting direction at the recording medium transporting surface). In the invention, either recording by a serial type or recording by a system capable of recording at a relative higher speed, for example, recording by the single pass system which is a system capable of recording by ejection by one scanning in the direction of main scanning may be adopted. According to the image recording method of the invention, an image at high quality having high image reproducibility and excellent scratch resistance can be obtained while maintaining the ejection stability even in the system by the single pass.

In this case, all of the treating liquid ejection head 12S, and ink ejection heads 30C, 30M, 30Y and 30K have the same structure.

It is preferred that the amount of applying the treating liquid and the amount of applying the aqueous ink are controlled in accordance with requirement. For example, the amount of applying the treating liquid may be changed for controlling the physical property such as viscoelasticity of an aggregate formed by mixing the treating liquid and the aqueous ink, in accordance with the recording medium.

The ink drying zone 15 is disposed at the downstream in the direction of transporting the recording medium of the ink ejection part 14. The ink drying zone 15 can be constituted in the same manner as in the treating liquid drying zone 13.

An image fixing part 16 may be disposed separately in accordance with requirement for providing a more intense fixing property to the recording medium after drying the image.

The image fixing part 16 is disposed further to the downstream in the direction of transporting the recording medium of the ink drying zone 15. In the image fixing part 16, a pair of rollers (fixing rollers 40A and 40B) which are in press contact with each other are disposed and, when the recording medium passes between the fixing rollers 40A and 40B, the image formed on the recording medium can be pressurized and heated to improve the fixing property of the image recorded on the recording medium. As the fixing rollers 40A and 40B, a pair of rollers in which one is a pressurizing roller and the other is a heating roller are preferred but the fixing rollers are not limited to such a pair.

Further, in the ink-jet recording apparatus, in the conveying path from the paper feed part to the accumulation part, heating means for applying a heating treatment to the recording medium may also be disposed. By elevating the temperature of the recording medium to a predetermined temperature by the heating means disposed at, for example, a predetermined position at the upstream side of the treating liquid drying zone, or a predetermined position between the ink ejection part 14 and the ink drying zone 15, it is possible to carry out drying and fixing effectively.

EXAMPLES

The invention will be described in detail by way of examples but the invention is not limited to the following examples so long as they are within the gist of the invention. Unless otherwise specified, "part" is based on mass.

The weight average molecular weight was measured by gel permeation chromatography (GPC). In GPC, HLC-8020GPC (manufactured by Tosoh Corporation) was used, and 3 pieces of TSKgel Super Multipore HZ-H (manufactured by Tosoh Corporation, 4.6 mm ID×15 cm) were used as the column, and THF (tetrahydrofuran) was used as an eluate. Further, the measurement was performed by using an IR detector under the conditions at a sample concentration of 0.35 mass %, a flow rate of 0.35 mL/min, a sample ejection amount of 10 μL, and a measuring temperature of 40° C. A calibration curve was prepared based on eight samples of "standard sample TSK: standard, polystyrene" of "F-40", "F-20", "F-4", "F-1", "A-5000", "A-2500", "A-1000", and "n-propylbenzene" manufactured by Tosoh Corporation.

Example 1

<Preparation of Ink>
(Synthesis of Polymer Dispersant P-1)
In accordance with the following scheme, a polymer dispersant P-1 was synthesized as shown below.

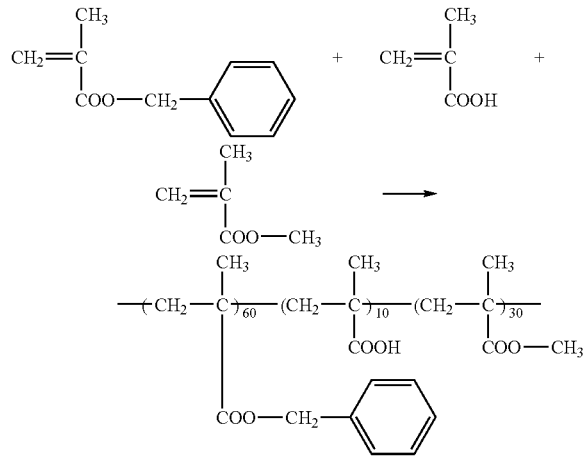

88 g of methyl ethyl ketone was put in a 1000 mL three-necked flask equipped with a stirrer and a cooling tube and heated to 72° C. in a nitrogen atmosphere, to which a solution in which 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone was dropped for 3 hr. After completing the dropping and further allowing the mixture to react for 1 hr, a solution in which 0.42 g of dimethyl-2,2'-azobisisobutyrate was dissolved in 2 g of methyl ethyl ketone was added and heated for 4 hr while elevating the temperature to 78° C. The obtained reaction solution was re-precipitated twice in a great excess of hexane and a precipitated resin was dried, thereby obtaining 96 g of a polymer dispersant P-1.

The composition of the obtained resin was confirmed by $^1$H-NMR and the weight average molecular weight (Mw) determined by GPC was 44,600. Further, when an acid value was determined according to the method described in JIS standards (JISK0070:1992, the disclosure of which is incorporated by reference herein), it was 65.2 mgKOH/g.

(Dispersion of Resin-Coated Pigment Particles)
10 parts of Pigment Blue 15:3 (phthalocyanine blue A220, manufactured by Dainichiseika Color & Chemicals Mfg. Co., Ltd.), 5 parts of the polymer dispersant P-1, 42 parts of methyl ethyl ketone, 5.5 parts of 1N aqueous NaOH solution, and 87.2 parts of ion exchanged water were mixed and dispersed for 2 to 6 hr by a bead mill using 0.1 mmϕ zirconia beads.

Methyl ethyl ketone was removed at 55° C. under a reduced pressure from the obtained dispersion and, further, a portion of water was removed, thereby obtaining a dispersion of resin-coated pigment particles at a pigment concentration of 10.2 mass %.

(Synthesis and Preparation of Self-Dispersing Polymer Particles)
—Synthesis of Self-Dispersing Polymer Particles B-1—
360.0 g of methyl ethyl ketone was charged in a 2 litter three-necked flask equipped with a stirrer, a thermometer, a reflux cooling tube, and a nitrogen gas introduction tube, and the temperature was elevated to 75° C. Then, while keeping the temperature inside the flask at 75° C., a solution mixture of 180.0 g of phenoxyethyl acrylate, 162.0 g of methyl methacrylate, 18.0 g of acrylic acid, 72 g of methyl ethyl ketone, and 1.44 g of "V-601" (manufactured by Wako Pure Chemical Industries, Ltd.) was dropped at a constant speed so as to complete dropping in 2 hr. After completion of the dropping, a solution of 0.72 g of "V-601" and 36.0 g of methyl ethyl ketone was added, stirred at 75° C. for 2 hr and then, a solution of 0.72 g of "V-601" and 36.0 g of isopropanol was further added and stirred at 75° C. for 2 hr. Then, the temperature was elevated to 85° C. and stirring was continued for further 2 hr, thereby obtaining a resin solution of phenoxyethyl acrylate/methyl methacrylate/acrylic acid (=50/45/5 [mass ratio]) copolymer.

The obtained copolymer had a weight average molecular weight (Mw) of 64,000 (determined by Gel permeation chromatography (GPC) and calculated based on polystyrene) and an acid value of 38.9 (mgKOH/g).

Then, the obtained resin solution was weighed by 668.3 g, to which, then 388.3 g of isopropanol and 145.7 mL of an aqueous solution of 1 mol/L NaOH were added and the temperature inside the reaction vessel was elevated to 80° C. Then, 720.1 g of distilled water was dropped at a rate of 20 mL/min to conduct dispersion with water, and, after keeping them under an atmospheric pressure at a temperature inside the reaction vessel of 80° C. for 2 hr, at 85° C. for 2 hr, and 90° C. for 2 hr, the inside of the reaction vessel was depressurized to distill off isopropanol, methyl ethyl ketone, and distilled water in total distilled amount of 913.7 g, thereby obtaining an aqueous dispersion of self-dispersing polymer particles B-1 at 28.0 mass % of solid concentration.

—Synthesis of Self-Dispersing Polymer Particles B-2 to B-4—

Various aqueous dispersions of the following self-dispersing polymer particles B-2 to B-4 were synthesized by the same method as for the aqueous dispersion of the self-dispersing polymer particle B-1 except for changing the monomer composition in the synthesis of the aqueous solution of the self-dispersing polymer particle B-1.
B-2: Phenoxyethyl acrylate/methyl methacrylate/acrylic acid (=53/42/5 [mass ratio]) copolymer,
B-3: Methyl methacrylate/ethyl acrylate/phenoxyethyl acrylate/acrylic acid (=55/10/30/5 [mass ratio]) copolymer,
B-4: Methyl methacrylate/isobornyl acrylate/phenoxyethyl acrylate/acrylic acid (=20/50/25/5 [mass ratio]) copolymer.

The weight average molecular weight Mw, the minimum film forming temperature MFT, the glass transition temperature Tg, and the volume average particle diameter Mv of the self-dispersing polymer particles obtained as described above are shown in the following Table 1. The weight average molecular weight was measured in the same manner as described above and MFT, Tg, and Mv were measured by the following methods.

TABLE 1

| Self-dispersing polymer particles | Weight average molecular weight | MFT | Tg | Particle diameter MV |
|---|---|---|---|---|
| B-1 | 64,000 | 22° C. | 50° C. | 15 nm |
| B-2 | 70,000 | 18° C. | 45° C. | 20 nm |
| B-3 | 69,000 | 30° C. | 55° C. | 25 nm |
| B-4 | 87,000 | 50° C. | 80° C. | 20 nm |

(1) Minimum Film Forming Temperature [MFT]

The MFT was measured by using an MFT measuring equipment manufactured by YOSHIMITSU SEIKI Co. Specifically, each of the obtained aqueous dispersions was adjusted to 25% liquid and, after blade coating to a thickness of the coating film of 300 μm for 50 cm length×3 cm width on a PET film (64 cm×18 cm), heating was applied from the back side of the PET film to provide a temperature gradient from 12° C. to 65° C. for the coated film, and dried under a circumstance at 20° C. and 22% RH for 4 hr. In this case, a boundary temperature (° C.) between a temperature at which white powdery precipitates were formed and a temperature at which a transparent film was formed was measured and defined as the minimum film forming temperature (MFT).

(2) Glass Transition Temperature [Tg]

An aqueous dispersion at 0.5 g solid matter was dried under a reduced pressure at 50° C. for 4 hr to obtain a solid polymer content. The glass transition temperature (Tg) was measured by using the obtained solid polymer matter by a differential scanning calorimeter (DSC) EXSTAR6220 manufactured by SII Nanotechnology Inc. The measuring conditions were as follows. An aluminum pan containing a sample in an amount of 5 mg was sealed, and the value at the top of peak for DDSC of the data measured at a second temperature elevation on the following temperature profiles in a nitrogen atmosphere was defined as Tg.
30° C.→50° C. (cooling at 50° C./min)
−50° C.→120° C. (temperature elevation at 20° C./min)
120° C.→50° C. (cooling at 50° C./min)
−50° C.→120° C. (temperature elevation at 20° C./min)

(3) Volume Average Particle Diameter [Mv]

The obtained aqueous dispersion was appropriately diluted to a concentration suitable to measurement, and the volume average particle diameter was measured for each of the aqueous dispersions by a dynamic light scattering method using a ultrafine particle size distribution measuring equipment NANOTRACK UPA-EX150 (manufactured by Nikkiso Company Ltd.). The same measuring conditions were employed for all of the dispersions. That is, measurement was performed under the following conditions.
Particle permeability: permeation,
Particle diffractive index: 1.51,
Particle shape: non-spherical shape,
Density: 1.2 g/cm$^3$,
Solvent: water, and
cell temperature: 18 to 25° C.

(Preparation of Cyan Ink C-1)

Cyan ink C-1 was prepared by using the dispersion of the resin-coated pigment particles described above and the aqueous dispersion of the self-dispersing polymer particles B-1, and further using a hydrophilic organic solvent, a surfactant, and ion exchanged water so as to provide the following composition.

| <Composition of Cyan Ink C-1> | |
|---|---|
| Cyan pigment (pigment blue 15:3) | 4 mass % |
| The polymer dispersant P-1 | 2 mass % |
| The self-dispersing polymer particle B-1 | 8 mass % |
| Sun Nix GP250 (hydrophilic organic solvent; manufactured by Sanyo Chemical Industries, Ltd) | 10 mass % |
| Diethylene glycol monoethyl ether (hydrophilic organic solvent; manufactured by Wako Pure Chemical Industries, Ltd.), | 5 mass % |
| OLFINE E1010 (surfactant; manufactured by Nissin Chemical Industry) | 1 mass % |
| Ion exchanged water | 70 mass % |

(Preparation of Cyan Ink C-2 to C-4)

Cyan inks C-2 to C-4 were prepared in the same manner as in the preparation for cyan ink C-1 except for replacing the self-dispersing polymer particles B-1 in the composition of the cyan ink C-1 with self-dispersing polymer particles B-2 to B-4.

(Preparation of Cyan Ink C-5)

Cyan ink C-5 was prepared in the same manner as in the preparation for Cyan ink C-1 except for replacing the self-dispersing polymer particle B-1 in the composition of the Cyan ink C-1 with JONCRYL 537 (manufactured by BASF Japan Co.) and adding 0.8 mass % of sodium oleate.

JONCRYL 537 had MFT of 42° C. and Tg of 35° C.

The surface tension, viscosity, volume average particle diameter and pH for each of the cyan inks obtained as described above were measured.

The surface tension was measured by using Automatic Surface Tensiometer CBVP-Z (manufactured by Kyowa Interface Science Co. Ltd.) under the condition at 25° C. and the viscosity was measured by using VISCOMETER TV-22 (manufactured by TOKI SANGYO CO. LTD.) under the condition at 20° C. Further, the volume average particle diameter was measured by the same method as described above and the pH was measured at 25±1° C.

TABLE 2

| Name of ink | Viscoisty [mPa · s] | Surface tension [mN/m] | Volume average particle diameter [nm] | pH |
|---|---|---|---|---|
| Ink C-1 | 4.7 | 35.6 | 69 | 8.6 |
| Ink C-2 | 4.8 | 35.4 | 70 | 8.5 |
| Ink C-3 | 4.2 | 35.4 | 71 | 8.6 |
| Ink C-4 | 4.5 | 35.4 | 70 | 8.5 |
| Ink C-5 | 4.0 | 32.1 | 73 | 9.0 |

<Preparation of Treating Liquid>

Ingredients of the following composition were mixed, and a treating liquid was prepared. When the viscosity, the surface tension, and pH (25±1° C.) of the treating liquid were measured, the viscosity was 4.9 mPa·s, the surface tension was 24.3 mN/m, and pH was 1.5. The surface tension and the viscosity were measured in the same manner as described above.

| <Composition for Treating Liquid> | |
| --- | --- |
| Citric acid (manufactured by Wako Pure Chemical Industries, Ltd.) | 16.7 mass % |
| Diethylene glycol monomethyl ether (manufactured by Wako Pure Chemical Industries, Ltd.) | 20.0 mass % |
| Zonyl FSN-100 (manufactured by DuPont Co.) | 1.0 mass % |
| Ion exchanged water | 62.3 mass % |

<Image Recording and Evaluation 1>

—1. Initial Ejection Property and Ejection Property after Temporary Suspension—

Samples for evaluation were prepared by using GELJET GX5000 printer head (full line head manufactured by Ricoh Co.), re-packing storage tanks connected thereto with Cyan Inks C-1 to C-5 obtained as described above and 96 lines were printed for 10 cm to a recording medium, at an ink droplet amount of 3.5 pL, at an ejection frequency of 24 kHz, and at a resolution of 75 dpi for nozzle arranging direction×1200 dpi for conveying direction. For the recording medium, GASAI SHASHIN SIAGE PRO (manufactured by Fujifilm Corporation) was used.

Then, the distances between the 96 lines at a position of 5 cm from the droplet ejection start portion of the sample for evaluation were measured by a dot analyzer DA-6000 (manufactured by Oji Scientific Instruments) and the standard deviation thereof was calculated, which was used as an index for evaluating "initial ejection property (ejection accuracy)".

Then, after the printing performed for the preparation of the sample for evaluation, droplet ejection was suspended for 10 min under the circumstance at 25° C. and 55% RH while leaving the printer head in the state as it was, and printing was performed again under the same conditions to prepare a sample for evaluation. The standard deviation for the distances between the 96 lines at a position 5 cm from the droplet ejection start portion of the sample for evaluation was calculated in the same manner as described above, which was used as an index for evaluating "ejection property after temporary suspension".

In the evaluation described above, after warming the cyan ink previously in a warm bath at each ejection temperature shown in the following Table 3, it was filled in storage tank connected to the printer head, and the printer head was set in a thermostatic chamber such that the ejection temperature described in the following Table 3 could be maintained, so that the ink could be ejected at each ejection temperature described in the following Table 3.

The initial ejection property and the ejection property after temporary suspension were evaluated according to the following evaluation criteria.

<Evaluation Criteria>

A: 3 μm or more and less than 4 μm

B: 4 μm or more and less than 5 μm

C: 5 μm or more

—2. Blocking—

A GEL JET GX5000 printer head (full line head manufactured by Ricoh Co.) was provided and the storage tanks connected thereto were re-packed by Cyan Inks C-1 to C-5 obtained as described above. TOKUHISHI ART DOUBLE-SIDED N (manufactured by Mitsubishi Papers Mills Ltd.) was fixed as a recording medium on a stage capable of moving in a predetermined linear direction at 500 mm/sec, to which the treating liquid obtained as described above (citric acid: 0.84 g/m$^2$) was coated by a wire bar coater to a thickness of about 5 μm, and dried at 50° C. for 2 sec just after coating. Then, the GELJET GX5000 printer head (full line head manufactured by Ricoh Co.) was fixed and arranged such that the direction of the line head where nozzles were arranged (main scanning direction) was inclined at 75.7° to a direction in perpendicular to the moving direction of the stage (sub-scanning direction) and the ink was ejected by a line system under the ejection conditions at an ink droplet amount of 3.5 pL, at an ejection frequency of 24 kHz, and at a resolution of 1200 dpi×600 dpi while moving the recoding medium at a constant speed in the sub-scanning direction, thereby printing a solid image. Just after printing, the recording medium on which the image was printed was dried at 60° C. for 3 sec, and was further passed between a pair of fixing rollers heated to 60° C., thereby performing a fixing treatment at a nip pressure of 0.25 MPa for a nip width of 4 mm. Thus, a sample for evaluation was obtained. The pair of fixing rollers include a heating roll in which the surface of a cylindrical core metal made of SUS was coated with a silicone resin and a halogen lamp was disposed in the inside of the cylindrical core metal, and a counter roll that press-contacts with the heating roll.

Then, the obtained sample for evaluation was cut into 3.5 cm×4 cm size, the sample for evaluation was placed with its printed surface being upward on an acryl plate of 10 cm×10 cm and, further, 10 pieces of not-printed TOKUHISHI ART DOUBLE-SIDED N (manufactured by Mitsubishi Paper Mills Ltd.) cut into the same size as the sample for evaluation was stacked above the sample for evaluation, further, an acryl plate of 10 cm×10 cm was placed, and they were left under the circumstantial condition at 50° C., 60% RH for 12 hr. After that, a weight of 1 kg was placed on the uppermost acryl plate and left for further 24 hr (corresponding to 700 kg/m$^2$ of weight). Thereafter, after storage under the circumstantial condition at 25° C. and 50% RH for further 2 hr, the not-printed TOKUHISHI ART (not printed paper) stacked above the sample for evaluation was peeled. The easiness in peeling and the color transfer after peeling were observed with naked eyes and evaluated in accordance with the following evaluation criteria.

<Evaluation Criteria>

A: Peeled easily and no color transfer to not-printed paper was observed

B: Resistance was felt when peeling due to sticking but no color transfer to the not-printed paper was observed.

C: Sticking occurred and slight color transfer to the not-printed paper was observed D: Strong sticking occurred and remarkable color transfer to the not-printed paper was observed.

—3. Scratch Resistance—

Not-printed TOKUHISHI ART cut to 10 mm×50 mm was wound around a paper weight (weight: 470 g, sized 15 mm×30 mm×120 mm) (the area in which not-printed TOKUHISHI ART and the sample for evaluation were contacted was 150 mm$^2$), and the sample for evaluation prepared in the evaluation in "2. blocking" was rubbed in reciprocation for three times (corresponding to 260 kg/m$^2$ of load). The printed surface after rubbing was observed with naked eyes and evaluated in accordance with the following evaluation criteria.

<Evaluation Criteria>
A: Peeling of image (coloring material) was not observed visually on the printed surface
B: peeling of image (coloring material) was observed visually on the printed surface.

TABLE 3

| No. | Cyan ink | Ejection temperature [° C.] | MFT [° C.] | Tg [° C.] | Initial ejection property | Ejection property after temporary suspension | Scratch resistance | Blocking | Remarks |
| --- | --- | --- | --- | --- | --- | --- | --- | --- | --- |
| 1 | C-2 | 15 (not warmed) | 18 | 45 | A | C | A | C | Comparative Example |
| 2 | C-2 | 30 (warmed) | 18 | 45 | A | C | A | B | Comparative Example |
| 3 | C-1 | 35 ± 1 (warmed) | 22 | 50 | A | A | A | B | Invention |
| 4 | C-1 | 40 ± 1 (warmed) | 22 | 50 | A | A | A | B | Invention |
| 5 | C-1 | 45 ± 1 (warmed) | 22 | 50 | A | A | A | B | Invention |
| 6 | C-3 | 45 ± 1 (warmed) | 30 | 55 | A | A | A | A | Invention |
| 7 | C-1 | 52 ± 1 (warmed) | 22 | 50 | C | C | A | B | Comparative Example |
| 8 | C-4 | 45 ± 1 (warmed) | 50 | 80 | A | A | B | A | Comparative Example |
| 9 | C-5 | 40 ± 1 (warmed) | 42 | 35 | B | C | A | C | Comparative Example |

As shown in Table 3, the ejection property after temporary suspension was deteriorated when the MFT is 20° C. or lower as shown in No. 1 and No. 2 (comparative examples). Further, the blocking was also deteriorated in No. 1 in which the ejection temperature was lower than 30° C. On the other hand, in No. 3 to No. 6 (invention), since the ejection temperature was equal to or lower than the glass transition temperature (Tg) and the ejection temperature was higher than the minimum film forming temperature (MFT), the ejection stability was good, and the scratch resistance and the blocking were excellent. In No. 7 (comparative example), since the ejection temperature was equal to or lower than the glass transition temperature (Tg), the ejection property was good. However, in No. 7, since the glass transition temperature (Tg) was lower than the ejection temperature (Tg<ejection temperature), the ejection stability was inferior. Further, as shown in No. 8 (comparative example), when the minimum film forming temperature (MFT) is higher than the ejection temperature, the scratch resistance was deteriorated. Further, when the glass transition temperature (Tg) was excessively low, the ejection stability could not be maintained and the blocking was also inferior.

<Evaluation 2>
—4. Ink Dot Diameter—
Dots (ink droplets) were ejected on a recording medium by using a GELJET GX5000 printer head (full line head manufactured by Ricoh Co.) and re-packing the storage tank connected thereto with Cyan Ink C-I obtained as described above, at an ink droplet amount of 3.5 pL, at an ejection frequency of 24 kHz, and at a resolution of 75 dpi in the nozzle arranging direction×1200 dpi in the conveying direction. As the recording medium, GASAI SHASHIN SIAGE Pro (manufactured by Fujifilm Corporation) was used. Ink droplet ejection was conducted twice in a room under the temperature circumstance at 18° C. and 25° C. For the ink dot diameter, the size of 25 dots deposited on the recording medium ejected from the same nozzle was measured by using a dot analyzer DA-6000 manufactured by Oji Scientific Instruments Co. and the average value for dot size of 50 dots in total (25 dots were measured for each temperature circumstance, and the measurements were conducted for two temperature circumstances described above) was calculated. The results are shown in the following Table 4.

TABLE 4

| No. | Kind of cyan ink | Dot diameter [μm] | Ejection temperature | | Remark |
| --- | --- | --- | --- | --- | --- |
| 11 | C-1 | 33.0 ± 1.5 | 15° C. (not warmed) | Ejection temperature < MFT < Tg | Comparative Example |
| 12 | | 32.7 ± 0.9 | 40 ± 1° C. (warmed) | MFT < Ejection temperature < Tg | Invention |
| 13 | | 32.6 ± 0.9 | 45 ± 1° C. (warmed) | MFT < Ejection temperature < Tg | Invention |

As shown in Table 4, it can be seen that the ink dot diameter changes greatly due to the external circumstance in a case of not applying heating (No. 1). On the other hand, stable dots were obtained without deteriorating the ejection stability by warming and keeping the temperature constant at 30° C. or higher.

In the examples described above, while description has been made mainly for the case of using the cyan pigment as the coloring material, similar effects were obtained also in a case of changing Pigment Blue 15:3 used as described above to other coloring materials than the cyan pigment such as Pigment Red 122, Pigment Yellow 74, and Carbon Black.

According to the present invention, it is possible to provide an ink-jet recording method by which the ejection stability may be maintained and an image of excellent scratch resistance can be obtained, as well as a recorded matter of excellent scratch resistance.

Hereinafter, exemplary embodiments of the present invention will be listed. However, the present invention is not limited to the following exemplary embodiments.

<1> An ink-jet recording method comprising recording an image by ejecting, onto a recording medium by an ink-jet method, a liquid composition containing polymer particles having a glass transition temperature (Tg) higher than the minimum film forming temperature (MFT), a hydrophilic organic solvent, a surfactant, and water under ejection conditions satisfying all of the following (1) to (3):
(1) Tg>the temperature of the liquid composition at the time of ejection>MFT,
(2) MFT>20° C.,
(3) the temperature of the liquid composition at the time of ejection is 30° C. or higher.

<2> The ink-jet recording method according to <1>, further comprising applying a heating treatment to at least the recorded image at a temperature equal to or higher than the glass transition temperature (Tg) or higher of the polymer particles after the recording of the image.

<3> The ink-jet recording method according to <1>, further comprising applying a heating and pressurizing treatment to at least the recorded image at a temperature equal to or higher than the glass transition temperature (Tg) of the polymer particles after the recording of the image.

<4> The ink-jet recording method according to any one of <1> to <3>, further comprising applying a treating liquid that enables formation of an aggregate at the liquid composition when the treating liquid is in contact with the liquid composition.

<5> The ink-jet recording method according to any one of <1> to <4>, wherein the polymer particles are self-dispersing polymer particles having a carboxyl group.

<6> The ink-jet recording method according to any one of <1> to <5>, wherein the polymer particles include a polymer having a carboxyl group synthesized in an organic solvent, and the polymer particles are obtained as particles dispersed in a polymer dispersion containing water as a continuous phase by partially or entirely neutralizing the carboxyl group of the polymer.

<7> The ink-jet recording method according to <5> or <6>, wherein the total content ratio of a structural unit derived from phenoxyethyl acrylate or phenoxyethyl methacrylate and a structural unit derived from benzyl acrylate or benzyl methacrylate in the self-dispersing polymer particles is at least from 15 to 80% by mass relative to the entire mass of the self-dispersing polymer particles.

<8> The ink-jet recording method according to any one of <1> to <7>, wherein the volume average particle diameter of the polymer particles is from 10 nm to 50 nm.

<9> The ink-jet recording method according to any one of <1> to <8>, wherein the liquid composition further contains a coloring material.

<10> The ink-jet recording method according to <9>, wherein the coloring material is a pigment.

<11> The ink-jet recording method according to <10>, wherein the pigment is coated with the polymer particles and contained in the liquid composition in a dispersed state.

<12> The ink-jet recording method according to any one of <1> to <11>, wherein the image is recorded by ejecting the liquid composition by a line method.

<13> A recorded matter recorded by the ink-jet recording method according to any one of <1> to <12>.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink-jet recording method comprising recording an image by ejecting, onto a recording medium by an ink-jet method, a liquid composition containing polymer particles having a glass transition temperature (Tg) higher than the minimum film forming temperature (MFT) by at least 5° C., a hydrophilic organic solvent, a surfactant, and water under ejection conditions satisfying all of the following (1) to (3):
   (1) Tg>the temperature of the liquid composition at the time of ejection>MFT,
   (2) MFT>20° C.,
   (3) the temperature of the liquid composition at the time of ejection is 30° C. or higher.

2. The ink-jet recording method according to claim 1, further comprising applying a heating treatment to at least the recorded image at a temperature equal to or higher than the glass transition temperature (Tg) of the polymer particles after the recording of the image.

3. The ink-jet recording method according to claim 1, further comprising applying a heating and pressurizing treatment to at least the recorded image at a temperature equal to or higher than the glass transition temperature (Tg) of the polymer particles after the recording of the image.

4. The ink-jet recording method according to claim 1, further comprising applying a treating liquid that enables formation of an aggregate at the liquid composition when the treating liquid is in contact with the liquid composition.

5. The ink-jet recording method according to claim 1, wherein the polymer particles are self-dispersing polymer particles having a carboxyl group.

6. The ink-jet recording method according to claim 1, wherein the polymer particles include a polymer having a carboxyl group synthesized in an organic solvent, and the polymer particles are obtained as particles dispersed in a polymer dispersion containing water as a continuous phase by partially or entirely neutralizing the carboxyl group of the polymer.

7. The ink-jet recording method according to claim 1, wherein the volume average particle diameter of the polymer particles is from 10 nm to 50 nm.

8. The ink-jet recording method according to claim 1, wherein the liquid composition further contains a coloring material.

9. The ink-jet recording method according to claim 8, wherein the coloring material is a pigment.

10. The ink-jet recording method according to claim 9, wherein the pigment is coated with the polymer particles and contained in the liquid composition in a dispersed state.

11. The ink-jet recording method according to claim 1, wherein the image is recorded by ejecting the liquid composition by a line method.

12. An ink-jet recording method comprising recording an image by ejecting, onto a recording medium by an ink-jet method, a liquid composition containing polymer particles having a glass transition temperature (Tg) higher than the minimum film forming temperature (MFT), a hydrophilic organic solvent, a surfactant, and water under ejection conditions satisfying all of the following (1) to (3):
   (1) Tg>the temperature of the liquid composition at the time of ejection>MFT,
   (2) MFT>20° C.,
   (3) the temperature of the liquid composition at the time of ejection is 30° C. or higher,
   wherein the polymer particles are self-dispersing polymer particles having a carboxyl group,
   wherein the total content ratio of a structural unit derived from phenoxyethyl acrylate or phenoxyethyl methacrylate and a structural unit derived from benzyl acrylate or benzyl methacrylate in the self-dispersing polymer particles is at least from 15 to 80% by mass relative to the entire mass of the self-dispersing polymer particles.

* * * * *